(12) United States Patent
Ritchie et al.

(10) Patent No.: US 11,314,656 B2
(45) Date of Patent: Apr. 26, 2022

(54) RESTARTABLE, LOCK-FREE CONCURRENT SHARED MEMORY STATE WITH POINTERS

(71) Applicant: Arista Networks, Inc., Santa Clara, CA (US)

(72) Inventors: Duncan Stuart Ritchie, Bowen Island (CA); Christopher Elisha Neilson, Vancouver (CA); Sebastian Sapa, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/991,893

(22) Filed: Aug. 12, 2020

(65) Prior Publication Data

US 2022/0050789 A1     Feb. 17, 2022

(51) Int. Cl.
    *G06F 12/1009*     (2016.01)
    *G06F 9/54*        (2006.01)

(52) U.S. Cl.
    CPC .......... *G06F 12/1009* (2013.01); *G06F 9/544* (2013.01); *G06F 2212/657* (2013.01)

(58) Field of Classification Search
    None
    See application file for complete search history.

(56) References Cited

U.S. PATENT DOCUMENTS

| 6,282,589 B1 * | 8/2001 | Porterfield | G06F 13/404 710/310 |
| 2014/0359232 A1 * | 12/2014 | Holbrook | G06F 16/2308 711/147 |

* cited by examiner

*Primary Examiner* — Gary W. Cygiel
(74) *Attorney, Agent, or Firm* — Fountainhead Law Group P.C.

(57) ABSTRACT

Systems and methods for processing memory address spaces corresponding to a shared memory are disclosed. After a writer restart process, pre-restart writer pointers of a pre-restart writer addressable space in the shared memory are replaced with corresponding location independent pointers. A writer pointer translation table is rebuilt in the shared memory to replace an association of modified pre-restart writer pointers and pre-restart translation base pointers based on the pre-restart writer pointers, respectively, with an association of modified post-restart writer pointers and post-restart translation base pointers based on post-restart writer pointers, respectively. After the writer pointer translation table is rebuilt, the location independent pointers are replaced with post-restart writer pointers in the shared memory, respectively, and the post-restart writer pointers are stored in the shared memory for access by one or more readers of the shared memory.

20 Claims, 7 Drawing Sheets

RESTARTABLE, LOCK-FREE CONCURRENT SHARED MEMORY STATE WITH POINTERS

BACKGROUND

The present disclosure relates to address processing of a shared memory by a writer and a reader of the shared memory in response to a writer restart operation.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
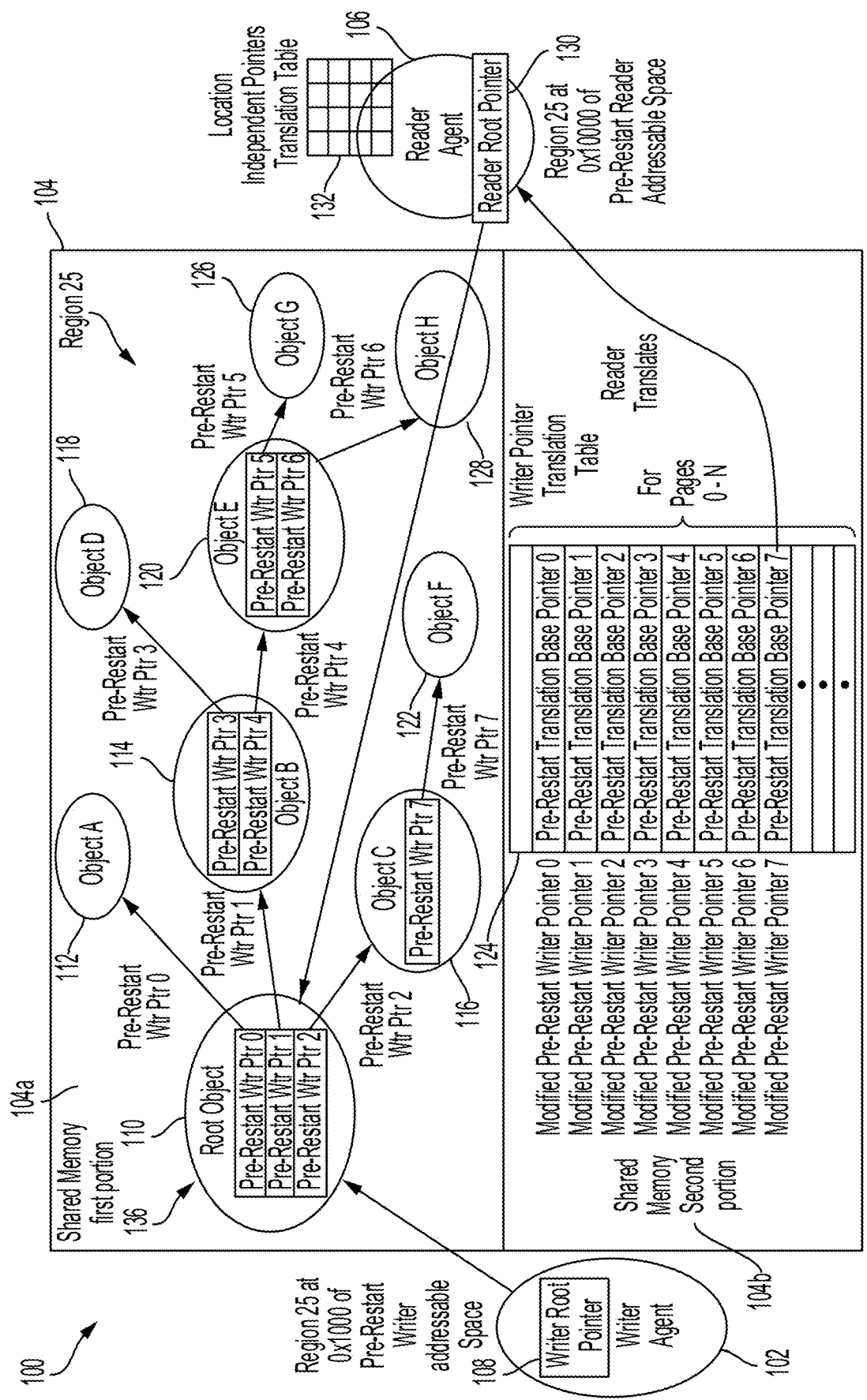
FIG. 1 shows an illustrative diagram of a memory management system 100, in accordance with some embodiments of the disclosure.

Shared memory-based systems benefit from certain inherent characteristics not typically realized by their counterpart memory integrated-based systems. An aspect of shared memories setting their systems role apart from integrated memory-based systems, for example, in state sharing system applications, is their physical isolation from their respective clients, e.g., agents, processes, and mechanisms interfacing with the shared memory. Their physical isolation helps shared memories carry on despite potential client upsets. More specifically, the contents of shared memories persist even in the face of shared memory client crashes, power restarts, power failures, and other types of client mishaps or interruptions. Client isolation is a shared memory constitution by virtue of the separate and independent shared memory addressable spaces relative to respective content producer clients ("writers" or "writer agents") and content consumer clients ("readers" or "reader agents").

In some cases, a writer constituent writes to shared memory locations with raw pointers of a distinct writer addressable space, shared memory space typically temporarily assigned to the writer constituent. A new writer process is generally assigned a different address space. For example, in applications with writer processes sourced from program code instructions (e.g., C++ program code), a writer process is typically assigned a distinct writer addressable space each time the writer process starts or restarts. From the shared memory reader perspective, a reader unique addressable space is typically also assigned for accessing shared memory locations for the reader to read writer published data. The reader addressable spaces are identified with reader raw pointers. The writer addressable space and the reader addressable space are two distinct addressable spaces, each addressable space including one or more regions (e.g. chunks of bulk memory) where each region starts at a uniquely identifiable non-overlapping base address of a (writer or reader) process' address range. Readers of a common shared memory are typically each assigned a distinct addressable space relative to other readers as well as to the shared memory writer for accessing shared memory locations. In this manner, writer pointers identify a writer-unique addressable space and reader pointers identify a reader-unique addressable space at any given time. The writer addressable space is fluid, typically, changing with each writer restart operation whereas the reader addressable space remains static in the face of writer restart operations.

Indeed, the chances of preserving writer pre-restart operation pointers for proper writer-addressable shared memory access in the event of a writer operation interruption, whether caused by a writer-encountered issue or intentionally initiated, are rather slim to negligible. As earlier indicated, before a writer restart operation, the writer addressable space may be and typically is entirely different than after the writer restart operation, e.g., the former may be mapped to the base address 0x1000 (in hexadecimal form) and the latter may be mapped to the base address 0x2000. While preserving pre-restart (operation) writer pointers is typically not a viable option in conventional systems, preserving pre-restart shared memory contents, a shared memory persistent characteristic, is a given in nearly all systems.

Writer published data (in shared memory) is precisely for reader accessibility and consumption but when the reader tries to access shared memory contents based on pre-restart writer address pointers, the reader is clearly misled in attempting to access the data at old and incorrect shared memory locations, and sometimes without the reader's knowledge, often leading to system dysfunction. The writer and reader can be effectively left without coordination in the aftermath of a writer restart operation. Accordingly, shared memory-based system architectures can be inadequately equipped for proper writer restart operations upon system power interruptions and disconnections.

In some prior art systems, to accommodate a writer restart process, the writer pre-restart operation state is preserved, to be restored during or after a post-restart operation but this is a memory-consuming venture requiring continuous writer state preservation for the mere anticipation of a writer restart operation—a costly tradeoff.

In some embodiments of the disclosure, the pre-restart (operation) writer pointers are preserved during a writer restart operation and the corresponding pre-restart (operation) writer address space is translated to a post-restart (operation) writer address space after the writer restart operation providing reliable shared memory reader access during and after the writer restart process. Shared memory readers have concurrent, lock-free, access to writer-published shared memory contents during a continuum of pre- and post-writer restart operation. The writer shields the shared memory readers from the uncertainty associated with the writer restart operation by implementing an intermediate stage process. Prior to the writer restart operation, a writer pointer translation table is built in shared memory using pre-restart writer pointers. After the writer restart operation, the writer replaces the pre-restart writer pointers (of the pre-restart writer address space) with intermediate location independent pointers in shared memory, and ultimately replaces the intermediate location independent pointers with post-restart writer pointers. The writer pointer translation table is ultimately populated exclusively with a modified version of post-restart writer pointers when the writer completes replacing all intermediate location independent pointers with corresponding post-restart writer pointers.

In some cases, prior to the writer restart operation, shared memory data is published with pre-restart writer pointers of a pre-restart writer addressable space, as it typically is, and after the restart operation, the pre-restart writer pointers are overwritten with temporary location independent pointers until the shared memory data is published with (new) post-restart writer pointers of a newly-assigned post-restart addressable space. At any given time during the writer restart operation address space management, no more than a single pointer translation table is processed, and no extra memory space is required.

In some embodiments, the shared memory is accessible to more than one reader and each reader performs independent, lock-free, and concurrent operations on the shared memory contents relative to the writer and any remaining shared memory readers. The concurrent readers remain working on the shared memory all throughout the writer restart process, essentially oblivious to the process. Even after the writer restarts and resumes operation, while the writer is busy constructing new (post-restart) writer pointers, concurrent readers continue to reliably perform respective reader operations on the shared memory data, blissfully ignorant of the writer restart process. Post restart, the writer converts all pre-restart writer pointers to post-restart writer pointers without causing confusion or missteps to the readers. The writer constructs a new (post-restart) writer pointer translation table independently of reader operations or even any system interruptions at a writer preferred and natural pace without data loss risk or data mismanagement jeopardizing the reader.

For a short duration of the restart period, when the writer is non-operational, readers carry on with normal reader operations, working on pre-restart published shared memory contents with no new published writer states until the writer resumes normal operation, post-restart. While readers may face some operational slowdown during this brief time period, they remain generally unaffected by the writer restart operation enjoying free and reliable access to writer-published shared memory contents through use of the intermediate and temporary location independent pointers.

Based on certain established writer-reader protocols, readers automatically know to access the shared memory locations with pre-restart writer (raw) pointers, location independent pointers, or post-restart writer (raw) pointers.

In some cases, for example, in state sharing memory systems, pre- or post-restart writer raw pointers may point to locations of entries of objects in shared memory regions. The shared memory may be organized into regions where the writer may allocate, deallocate, create, delete, and in some cases modify entries of objects of the shared memory regions. Each of the pre-restart writer addressable space and the post-restart writer addressable space may correspond to randomly situated regions of shared memory locations. When the writer restarts, all writer addressable shared memory regions may be mapped to an assigned writer address space distinct from the assigned writer address space prior to the writer restart operation. For example, a region 25 in shared memory may be mapped at a writer base address of 0x100000 prior to a writer restart operation and after the writer restarts, region 25 may be mapped to a writer base address of 0x200000 yet concurrent readers are made to keep up with writer publications regardless of the change in the writer base address, seamlessly making reader progress prior, during, and after the restart process.

In accordance with an embodiment of the disclosure, a method of processing memory address spaces corresponding to a shared memory is disclosed. The process may be achieved in three stages in response to a writer restart operation. At stage one, the writer replaces the pre-restart writer pointers of a pre-restart writer addressable space in the shared memory with corresponding location independent pointers. The pre-restart writer pointers uniquely identify locations of entries in the shared memory at the pre-restart writer addressable space employed by the writer to access the entries in the shared memory prior to the writer restart operation. At stage two, the writer rebuilds a writer pointer translation table in the shared memory to replace an association of modified pre-restart writer pointers and pre-restart translation pointers (based on the pre-restart writer pointers), respectively, with an association of modified post-restart writer pointers and post-restart translation pointers (based on post-restart writer pointers), respectively. The post-restart writer pointers uniquely identify the locations of the entries in the shared memory at a post-restart writer addressable space employed by the writer to access the entries in the shared memory after the writer restart operation. At stage three, the last stage, the writer replaces the location independent pointers with the post-restart writer pointers in the shared memory, respectively. The post-restart writer pointers are thereafter saved in the shared memory for continued shared memory access by one or more readers of the shared memory.

At each stage of the process, one or more concurrent readers traverse the shared memory contents with no adverse implications. In some region-organized shared memory embodiments, a location independent pointer may uniquely identify a shared memory region. In some shared memory systems, the locations of shared memory regions are known to both the writer and the reader. Accordingly, while at stages one and three, shared memory readers may translate writer pointers to reader pointers, during stage two of the process, there is no need for translation of the location independent pointers to reader pointers. That is, location independent pointers of the stage two process are not based on writer- or reader-assigned address spaces therefore requiring no in-shared memory translation to reader pointers. In some cases, the system may exhibit higher performance during stages one and three relative to stage two due to the inherent fast-processing nature of raw pointers relative to that of the location independent pointers.

In some embodiments, as previously noted, the writer pointers may identify entries in the shared memory. Objects of the entries may be organized into a hierarchical state data structure and in some cases, an object of a hierarchical state data structure may include one or more other objects, for example, a collection of objects, and those objects may themselves include yet other nested objects or one or more other collections of objects and so on.

In some embodiments, the writer pointers and the reader pointers are both atomic in nature allowing the writer to concurrently and, in a lock-free fashion modify any of the writer raw pointers while the readers simultaneously access the same or other shared memory locations. The atomic data unit characteristic of the writer and reader pointers ensures that the reader reliably read data from shared memory locations common to the locations into which the writer may be publishing data because either all or no part of the entirety of the atomic data unit can change at any given time.

While the writer overwrites pre-restart writer pointers with location independent pointers, at stage two of the process, the readers nevertheless continue to make forward progress, even continuing with processes begun prior to the writer restart process. In some embodiments, during stage two, the reader is made aware of an address pointer indicator type, set by the writer to direct the reader to a shared memory writer pointer translation table, or not. The reader disambiguates writer raw pointers and location independent pointers. While the writer patches the pre-restart writer raw pointers with location independent pointers, each done one shared memory entry at a time, the reader is simultaneously made aware of the use of corresponding location independent pointers. Accordingly, the speed at which the writer overwrites the raw pre-restart pointers with raw post-restart pointers is made irrelevant to the reader and forward reader progress.

As earlier discussed, in some embodiments, at stage two of the restart process, the writer converts all pre-restart writer pointers to location independent pointers. In some cases, the location independent pointers may point to regions and offsets of the shared memory, denoted by region-offset pairs. Shared memory entries may be identified by region identifications, for example, each region identification identifying a distinct shared memory region. Offsets identify entries within corresponding shared memory regions. In another example, region identifications may be eliminated entirely, and a location independent pointer may identify a single memory space occupied by a single region (in shared memory) with offset identifications identifying offsets within the single region rather than identification by region-offset pairs. In some embodiments, location independent pointers are complex and not direct memory identifiers like raw pointers. For example, a location independent pointer may be a hashed function.

Continuing with the stage two process discussion, the writer may walk through all the shared memory regions and build a new translation map based on region identifications and offset pairs of the shared memory regions, but the writer does so from a writer post-restart perspective. As the translation table is being rebuilt with post-restart writer pointers, for each existing shared memory region, offset pair, in some embodiments, the writer changes the state of a corresponding address pointer type indicator directing the readers to use the post-restart writer pointers in place of the temporarily assigned location independent pointers. The reader then knows to resort to the corresponding newly built (post-restart) table of writer pointers for precise access to an addressed shared memory entry.

In some state sharing memory systems, each region entry may include a header or metadata field in addition to the entry data. In an example application, the metadata field may include a region offset represented, for example, by a 32-bit or a 64-bit (binary) number but to institute address alignment features, one or more of the offset bits may remain unchanged, for example, fixed at the value "0", therefore carrying no meaningful data. In some embodiments, the unused one or more bits, i.e. at the top or bottom of the 32-bit or 64-bit number, may be programmed to convey the address pointer type of a corresponding region entry. For example, when set, or reset, an address pointer type indicator may represent a writer raw pointer type and when with an opposite polarity, reset, or set, respectively, the address pointer type indicator may represent a location independent pointer type.

In some embodiments, the writer sets or resets an address pointer type indicator of a corresponding entry in a shared memory location simultaneously with or after overwriting a pre-restart writer pointer of the corresponding entry with a location independent pointer. In some embodiments, the writer may set or reset an address pointer type indicator simultaneously with or after overwriting a location independent pointer of a corresponding entry with a post-restart writer pointer.

In some state sharing embodiments implementing hierarchical state trees, a writer may determine object types of the objects of a hierarchical state tree, at stage one of the process. The object types may be subsequently the subject of stage two of the process for determining location independent pointers in several different optional manners. In some embodiments, the writer may locate the object types based on a root (or "root object") of a hierarchy. For example, a table, a queue, or a list of parent object addresses may be scanned to locate parent object addresses having a NULL value where a NULL value represents the root of the hierarchical state tree. Alternatively, the object entries of a hierarchy may be tagged for identification of the corresponding object type. Further details of a shared memory with hierarchical state data structures having root objects, parent objects, and child objects can be found in U.S. patent application Ser. No. 16/886,692, titled "Lock-Free Method of Transmitting Hierarchical Collections Through Shared Memory", filed on May 28, 2020, by Neilson, et al., the disclosure of which is incorporated by reference as though set forth in full.

In some cases, the layout of the entry data (e.g., object instances) is useful to the writer in determining the location of object pointers (e.g., object pointers (also referred to herein as "writer pointers", "raw writer pointers", "pre-restart writer pointers", and "post-restart writer pointers")). In some embodiments, the writer learns of the entry data layout from the object type (e.g., a parent object or a child object of a parent object). For example, the writer may find the root object of a hierarchy by use of a local writer root pointer. The writer root pointer leads the writer to the root object in the shared memory. Finding the root of a hierarchy in shared memory reveals the root type to the writer. For example, in an implementation, an object may have a corresponding parent object address, identifying the location of an object in an immediately higher hierarchical level and in this scenario, a parent address of the root object may indicate the object is a root type of object based on a predetermined object address value (e.g., a NULL value indicates the object is a root object). Accordingly, by having knowledge of the entry data layout, the writer is inherently made aware of the location of the object pointers.

In some embodiments, the layout of a data entry is required to determine the location of the object pointers in a hierarchical state data structure. The object type may reveal the data layout in the hierarchy. To determine the object type, in some embodiments, the root object of the hierarchy is located and one or more pointers of the root object point to the location of respective connecting objects which may themselves include pointers to other objects of the hierarchy and so on. The writer has inherent awareness of the root object type and all objects (e.g., child objects of parent objects) throughout the hierarchy. Further details of a parent-child hierarchy implementation may be found in U.S. patent application Ser. No. 16/886,692 filed on May 28, 2020, by Neilson et al, and titled "Lock-Free Method of Transmitting Hierarchical Collections Through Shared Memory". While in some embodiments, the object type may be determined by embedding extra type information in each object data entry, in some embodiments, the object type may be determined without requiring embedding extra type information in each object data entry. In still other implementations, the entry data may contain a type identifier, or another type of mapping information, for example, to enable the writer to perform a search in a type table to discover the location of the object pointers in the entry in which case the writer need not discover the hierarchy object roots to determine all the object types in the hierarchy because each entry data contains the necessary type information.

In some embodiments, after the completion of stage two of the writer restart process when all pre-restart writer pointers are successfully converted to corresponding location independent pointers in shared memory, stage three of the process is consummated and the writer rebuilds the translation table from the perspective of the writer at the new post-restart writer address space.

In some embodiments, a reader processes a reader memory address space corresponding to a shared memory by accessing an entry in the shared memory. The entry includes a corresponding writer pointer with a corresponding address pointer type indicator representing a writer pointer type or a location independent pointer type. The entry further includes entry data written by a writer of the shared memory. In response to the address pointer type indicator representing the writer pointer as a writer pointer type, the reader reads a translation pointer from a writer pointer translation table of the shared memory, the translation pointer is based on the writer pointer. The reader determines a local reader pointer based on the translation pointer; the local reader pointer uniquely identifies the location of the entry in the shared memory at a reader addressable space employed by the reader to access the entry in the shared memory. In response to the address pointer type indicator representing the writer pointer being a location independent pointer, the reader determines that the local reader pointer is based on the location independent pointer. The location independent pointer uniquely identifies the location of the entry in the shared memory at the reader addressable space employed by the reader to access the entry in the shared memory.

In various illustrated embodiments and related descriptions, a method of managing address pointers of a writer agent (or "writer"), a producer to a shared memory common to a reader agent ("reader") during a writer restart process is disclosed. FIG. 1 shows an illustrative diagram of a memory management system. In FIG. 1, a memory management system 100 is shown to include a writer agent 102, shared memory 104, and a reader agent 106, in accordance with an embodiment of the disclosure. In some embodiments, each of writer agent 102 and reader agent 106 is implemented in software, hardware, or a combination thereof. Shared memory 104 may be made of persistent memory, such as without limitation, non-volatile memory (e.g., FLASH), non-persistent memory, such as without limitation, random-access-memory (RAM), or a combination thereof.

Figure 2:
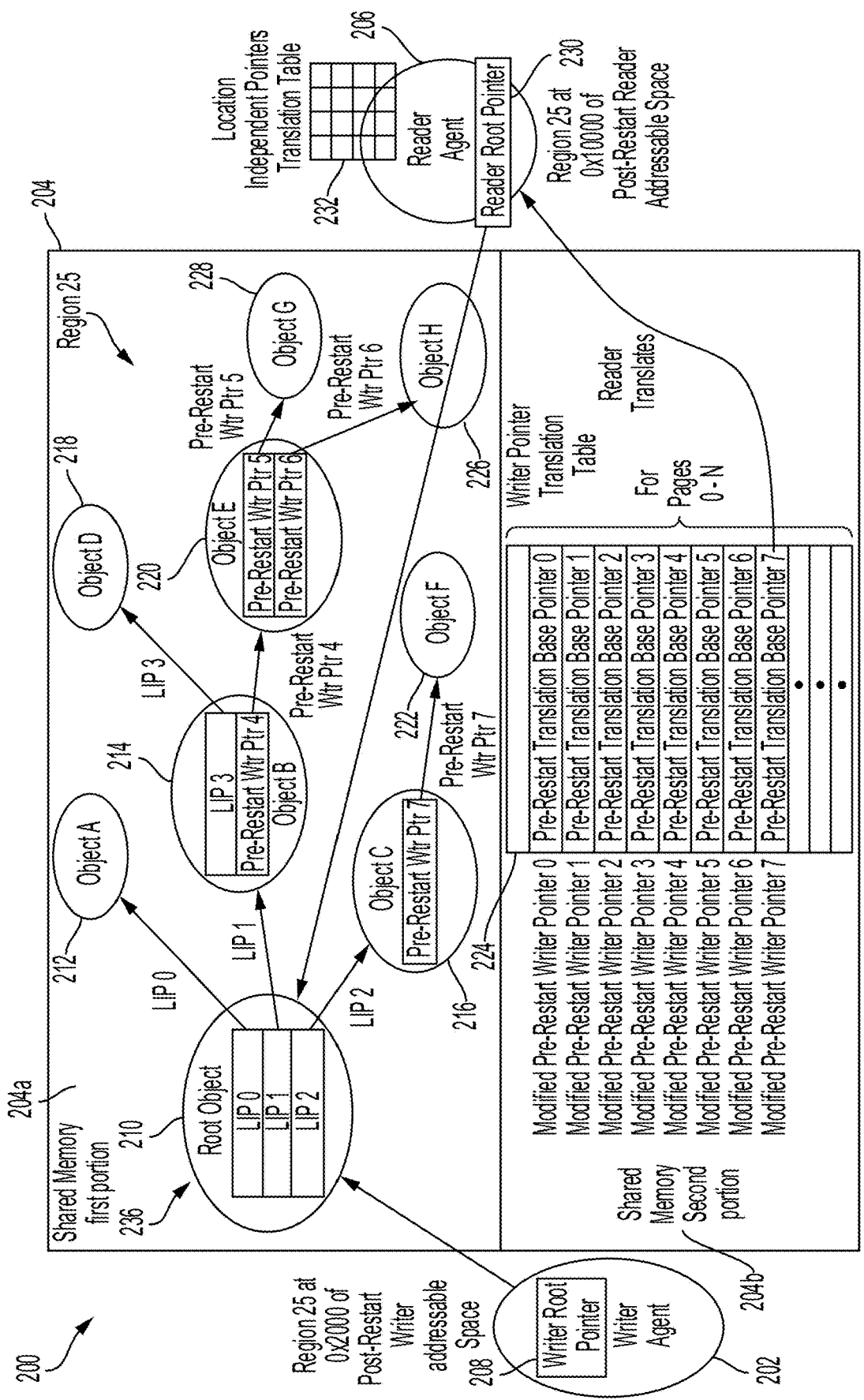
FIG. 2 shows an illustrative diagram of a memory management system 200, in accordance with some embodiments of the disclosure.
Figure 3:
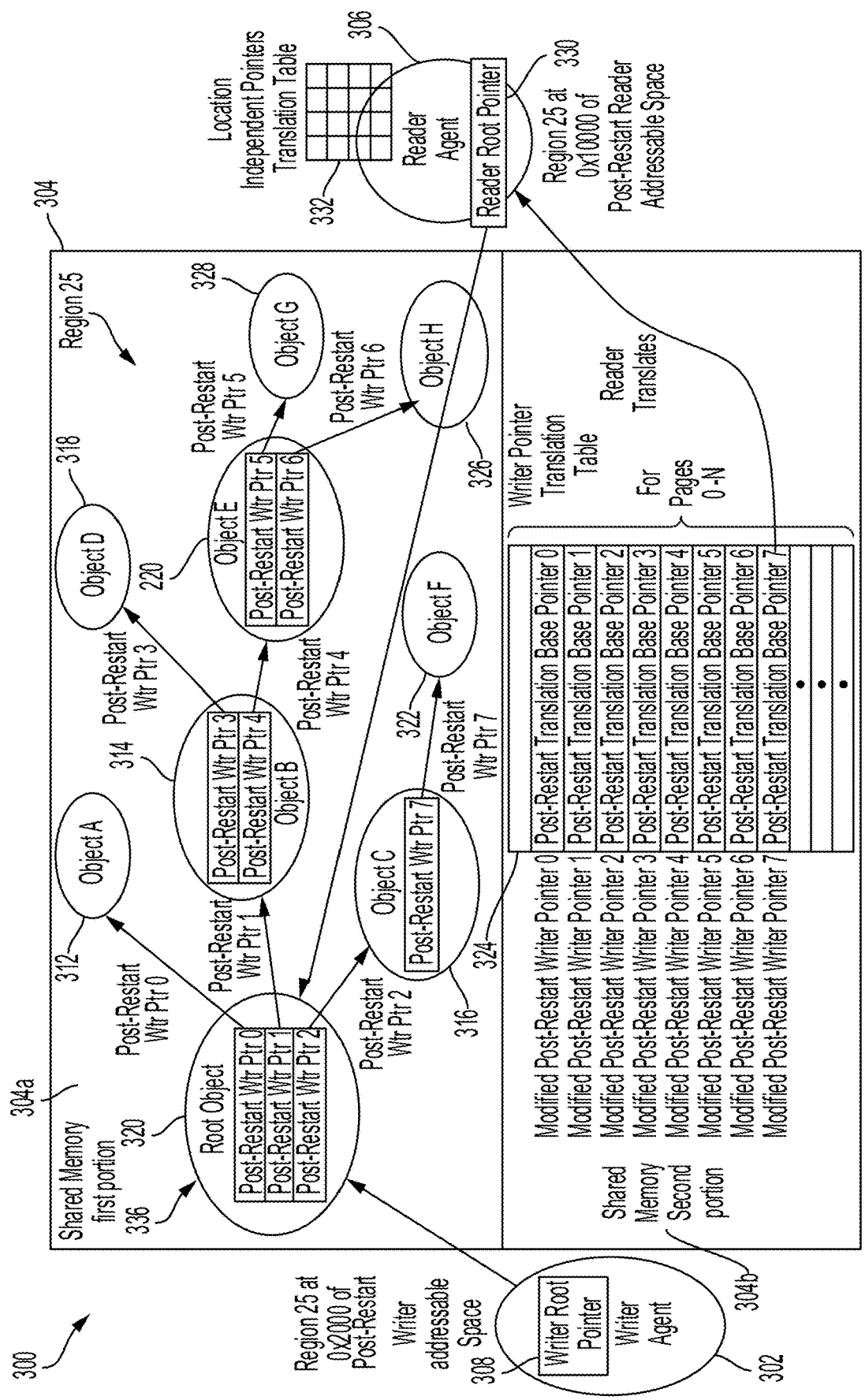
FIG. 3 shows an illustrative diagram of a memory management system 300, in accordance with some embodiments of the disclosure.

FIG. 1 shows the state of shared memory 104 at a first step (or stage), at a pre-writer restart memory state, prior to a three-step writer restart process. The state of shared memory 104 may be at a pre-writer restart memory state in anticipation of, immediately prior to a restart operation of writer agent 102. Writer agent 102 may restart in response to various events, for example, a system power-down and power-up sequence of events, an electrical disconnection and reconnection to shared memory 104, or other system interruption of sorts. As further discussed below, the embodiments of FIGS. 2 and 3 illustrate various writer restart memory state examples during a three-step (or three-stage) writer restart process.

In some embodiments, writer agent 102 may be, in part or in whole, incorporated in shared memory 104. In some embodiments, writer agent 102 resides wholly externally to shared memory 104, as shown in the embodiment of FIG. 1. Like the writer agent, reader agent 106 may be, in part or in whole, incorporated in shared memory 104. In some embodiments, such as the embodiment of FIG. 1, reader agent 106 may reside wholly externally to shared memory 104. While not shown in FIG. 1, shared memory 104 may have additional consumers. For example, more than one reader agent (other than reader agent 106) may be a consumer of shared memory 104.

In some embodiments, shared memory 104 is configured to store distinct types of information. For example, a first portion 104a of shared memory 104 may store entries of data (or objects) and a second portion 104b of shared memory 104 may store associations, tables, or arrays of information in relation to accessing the objects of the first portion 104a. It is understood that the division of shared memory 104 into first portion 104a and second portion 104b is largely conceptual and that shared memory 104 may accommodate object (or data), object (or data) information, and object (or data) accessing information with no shared memory partitioning or even with additional partitioning (a greater number of partitions than the two partitions 104a and 104b). For example, the objects of shared memory 104 may be organized in a hierarchical fashion, randomly distributed in shared memory 104 along with object access-related information. That is, the content of the first portion 104a and the second portion 104b may be commingled. The content of the first portion 104a and the second portion 104b of shared memory 104 may be partitioned into more than two portions. For example, the objects of the first portion 104a may be organized into more than one partition, the objects of the second portion 104b may be organized into more than one portion, or a combination thereof. In some embodiments, shared memory 104 comprises shared memory buffers in the first portion 104a for storing entry objects and entry object accessing information (e.g., tables, arrays, and associations) in the second portion 104b. The shared memory buffers of the first portion 104a of the shared memory may be allocated, in random or structured order, to entries of objects of a hierarchical state data structure. The first portion 104a shared memory buffers may be organized into regions of shared memory locations including hierarchical state data structures, each with a corresponding one or more root objects. In some cases, the hierarchical state data structures include hierarchical levels of objects sprouting from a single root object. In the embodiment of FIG. 1, shared memory 104 is shown to include a region, specifically, an example region 25, including a hierarchical state data structure 136 with a root object 110. In some embodiments, each of writer agent 102 and reader agent 106 may include a corresponding root pointer for identifying the location of root object 110. For example, writer agent 102 may include writer root pointer 108 for identifying the location of root object 110 in shared memory 104 and reader agent 106 may include reader root pointer 130 for identifying the location of root object 110 in shared memory 104.

In some embodiments, hierarchical state data structure 136 includes one or more collections of entries, each entry including an object (or object instance) of a logical representation of a system state. A system state of an entry may describe an attribute or a characteristic of a system at any given time. For example, a system state may be based on a network route attribute like a protocol in a networking environment. An object is generally a language object that may include one or more tables and/or one or more processes. An object may be of various types of objects, for example, an object may be a C++, Java, D, C#, and/or other types of language objects.

At least some of the collections of the hierarchical state data structure 136 are organized into a hierarchy of objects entries. In some embodiment, hierarchical state data structure 136 may be a hierarchical state tree. In some embodiments, a multi-level hierarchical state data structure (e.g. hierarchical state data structures 136, 236, 336 of FIGS. 1, 2, 3, respectively) is a multi-level hierarchical state tree. The shared memory buffers of shared memory 104 may be used for storing system states of the multi-level hierarchical state data structure 136. The shared memory buffers of shared memory 104 may be updated in response to changes to the system states of hierarchical state data structure 136. In some embodiments, an entry spans a single shared memory buffer of shared memory 104. Alternatively, an object entry may span more than one shared memory buffer of shared memory 104. An object entry may be value-based, key-value based, or reference count-based. For example, in the embodiment of FIG. 1, the objects shown in ovals (e.g., objects A-H) may each be reference count objects. In some embodiments, not all objects of a hierarchy are reference count objects and may be value-based, key-based, or a combination of the three, as previously discussed. Each object of hierarchical state data structure 136 may include one or more pointers with each of the object pointers identifying the location of another object at a different hierarchical level of hierarchical state data structure 136. In this manner, the two objects are linked. Not all objects of a hierarchical state data structure necessarily include a pointer. For example, object A 112, object D 118, object F 122, object G 126, and object H 128 of hierarchical state data structure 136 are each shown without a pointer and therefore without a connection to another object.

In the embodiment of FIG. 1, hierarchical state data structure 136 is a multi-level hierarchical structure of objects, namely objects A-H, situated at different levels of the hierarchy and originating from root object 110. While the embodiment of FIG. 1 shows hierarchical state data structure 136 to include a specific number of objects organized at a specific number of hierarchical levels, it is understood that hierarchical state data structure 136 may include a different number of objects organized at a different number of hierarchical levels. The objects at different hierarchical levels of hierarchical state data structure 136 (including root object 110) are linked by pointers. For example, assuming root object 110 defines the first hierarchical level of hierarchical state data structure 136, object A 112, object B 114, and object C 116 are at the second hierarchical level of hierarchical state data structure 136; object D 118, object E 120, and object F 122 are at the third hierarchical level of hierarchical state data structure 136; and object G 126 and object H 128 are the fourth hierarchical level of hierarchical state data structure 136. The pointers of the foregoing objects are each a raw writer pointer at the stage of the writer restart operation (pre writer restart operation) shown in the embodiment of FIG. 1 —pre-restart writer pointers. For example, root object 110 is shown to include three raw writer pointers, namely pre-restart writer pointer 0, pre-restart writer pointer 1, and pre-restart writer pointer 2; object B is shown to include two raw writer pointers, namely, pre-restart writer pointer 3, and pre-restart writer pointer 4; object E is shown to include two raw writer pointers, namely, pre-start writer pointer 5 and pre-start writer pointer 6; and object C is shown to include one raw writer pointer, namely, pre-restart writer pointer 7. The writer employs an object pre-restart writer pointer for linking the object to a next tier hierarchy in the hierarchical state data structure.

As previously discussed, writer agent 102 is a producer to shared memory 104 and writes state entry data to regions of shared memory 104, and reader agent 106 is a state consumer of shared memory 104 and reads the state entry data written to shared memory 104. For example, in the embodiment of FIG. 1, writer agent 102 may write data to region 25 of the first portion 104a of shared memory 104, reader agent 106 may consume the data written to region 25 by writer agent 102. In some embodiments, each agent locates a hierarchical state data structure in a region of shared memory 104 using the corresponding hierarchy root object. For example, as previously indicated, writer agent 102 may locate hierarchical state data structure 136 in shared memory 104 with writer root pointer 108 and reader agent 106 may locate hierarchical state data structure 136 in shared memory 104 with reader root pointer 130. Each of the writer root pointer 108 and reader root pointer 130 point to root object 110 of shared memory 104. Having located the hierarchy root object, each agent then finds linked objects, if any, in the next immediately following hierarchical tier using the pointers of the root object and find objects, if any, of the following hierarchical tier using the pointers of the immediately preceding hierarchical tier and so on. For example, writer agent 102 and reader agent 106 each locate hierarchical state data structure 136 by locating root object 110, the address of which is maintained by each agent. By finding root object 110, each agent 102 and 106 may locate object A 112 by pre-restart writer pointer 0 of root object 110. Similarly, object B 114 may be located by use of the pre-restart writer pointer 1 from root object 110; object C may be located by use of the pre-restart writer pointer 2 from root object 110; object D may be located by use of the pre-restart writer pointer 3 from object B 114; object E 120 may be located by use of the pre-restart writer pointer 4 from object B 114; object G 126 may be located by use of the pre-restart writer pointer 5 from object E 120, and so on.

In some embodiments, writer agent 102 may operate on shared memory 104 concurrently while reader agent 106 (and possibly additional reader agents not shown in FIG. 1) consumes data from or simply monitors shared memory 104. Similarly, reader agent 106 (and possibly additional reader agents not shown in FIG. 1) may read states from shared memory 104 concurrently relative to possibly other shared memory readers as well as relative to writer agent 102. In some embodiments, writer agent 102 is a process implemented by execution of program (software) code by one or more processors. Similarly, reader agent 106 may be a process implemented by execution of program code by one or more processors. Reader agent 106 may read an entry (data), representing a system state, stored in shared memory 104 via a corresponding reader manager not shown in FIG. 1. In some embodiments, reader agent 106 performs read operations in a lock-free and wait-free fashion. While the writer modifies shared memory data, the reader may concurrently read shared memory data. Accordingly, shared memory 104 data may be independently accessed by the one or more readers without regard to writer agent 102 and without regard to the remaining shared memory reader agents. Similarly, removal of objects of the hierarchical state data structure 136 in shared memory 104 may be done independently and without effect to reader agent 106, by writer agent 102.

In some embodiments, writer agent 102 may perform operations on data structure 136 through a writer manager not shown in FIG. 1. For example, a writer manager may serve as a conduit from writer agent 102 to shared memory 104 for allocating and deallocating object entry memory spaces among other care taking operations as discussed herein. In some embodiments, system 100 is absent a writer manager, as shown in FIGS. 1-3, and writer agent 102 allocates, deallocates object entry memory spaces among performing other shared memory-related tasks.

One of the features of system 100 supporting the independent operation of agents 102 and 106, in addition to possibly other reader agents, on shared memory 104 is the distinct addressable space assigned to each agent at any given time. In some embodiments, assignment of an addressable space may be performed by a writer manager that may be in part or in whole incorporated in the writer agent or may reside externally to the writer agent. For example, the writer manager may make a request to a bulk memory for a chunk of memory and may then assign the chunk of memory to the addressable space. In some embodiments, an addressable space is assigned to writer agent 102 prior to a writer restart operation (pre-restart writer addressable space). For example, in the embodiment of FIG. 1, the pre-restart writer addressable space with region 25 starts at base address 0x1000 (in hexadecimal format). That is, to access region 25 of hierarchical state data structure 136 of shared memory 104, writer agent 102 employs address 0x1000. In an embodiment, address 0x1000 may be the base address for identifying the first location of hierarchical state data structure 136 by writer agent 102. Analogously, in some embodiments, an addressable space is assigned to reader agent 106 prior to a writer restart operation (pre-restart reader addressable space). For example, in the embodiment of FIG. 1, the pre-restart reader addressable space for region 25 starts at base address 0x10000 (in hexadecimal format). That is, to access region 25 of hierarchical state data structure 136 of shared memory 104, reader agent 106 employs address 0x10000. In an embodiment, address 0x10000 may be the base address for identifying the first location of hierarchical state data structure 136 by reader agent 106. In some embodiments, each of the writer and reader address space assignments may be made by a corresponding agent manager. In some embodiments, the writer/reader address space assignments may be performed automatically. For example, the Linux kernel may automatically provide the address space assignments.

In some embodiments, the second portion 104b of shared memory 104 includes one or more writer pointer translation tables. In the embodiment of FIG. 1, the second portion of shared memory 104 is shown to include a writer pointer translation table 124. It is understood that the second portion 104b of shared memory 104 may include one or more tables in addition to table 124, or table 124 itself may comprise more than one table, or a combination thereof. The tables of the second portion 104b of shared memory 104 maintain associations of modified pre-restart writer pointers and pre-restart translation pointers based on the pre-restart writer pointers of the first portion 104a of shared memory 104, respectively. Alternatively, or additionally, the tables of second portion 104b may maintain associations of the pre-restart writer pointers of the first portion 104a of shared memory 104 and pre-restart translation pointers. In the embodiment of FIG. 1, table 124 maintains an association of modified pre-restart writer pointers and pre-restart translation pointers. Table 124 may maintain an association of modified pre-restart writer pointers and pre-restart translation pointers instead of an association of the pre-restart writer pointers and pre-restart translation pointers for various reasons, such as without limitation, to cover an extended number of associations of prestart writer pointers or to reduce the size of each pre-start writer pointer to be maintained in shared memory for cost-effectiveness. For example, the modified pre-restart writer pointers may be a truncated version of corresponding pre-restart writer pointers of the first portion 104a of shared memory 104 with each modified pointer requiring less memory space. The associations of the second portion 104b may be based on modified pre-restart writer pointers of the first portion 104a on a memory page boundary basis. For example, each of the modified pre-restart writer pointers may be a truncation of a corresponding pre-restart writer pointer by several bits defining a page size. The modified pre-restart writer pointers of table 124 need not be a truncation of the pre-restart writer pointers of the first portion 104a of shared memory 104 and may instead be a different type of modification of the pre-restart writer pointers. For example, the modified pre-restart writer pointers of table 124 may be assigned based on a certain pattern of assignments in connection with the pre-restart writer pointers of the first portion 104a of shared memory 104.

In the embodiment of FIG. 1, each of the modified pre-restart writer pointers of table 124 is a 12-bit truncation of a corresponding pre-restart writer pointer of the objects of the first portion 104a of shared memory 104. Table 124 is indexed by the modified pre-restart writer pointers (post truncation of the pre-restart writer pointers.) For example, modified pre-restart writer pointer 0 of table 124 is a 12-bit truncation of pre-restart writer pointer 0 of root object 110. That is, writer agent shifts the pre-restart writer pointer 0 to the right by 12 bits to generate the modified pre-restart writer pointer 0 of table 124. The 12 truncated lowest significant bits (LSBs), representing an addressable range of 4 kilo bytes (Kbytes) in decimal notation, correspond to a 4 Kbyte-page size in shared memory first portion 104a. Accordingly, the information in table 124 pertains to N number of shared memory pages, "N" being an integer value. It is understood that writer agent 102 may truncate each pre-restart writer pointer by more than or less than 12 bits to accommodate a different page size. In some embodiments, writer agent 102 may truncate the pre-restart writer pointer by the most significant bits (MSBs), for example, irrespective of page size.

The modified pre-restart writer pointers of table 124 index pre-restart translation base pointers of table 124. For example, modified pre-restart writer pointer 0 serves as index to pre-restart translation base pointer 0; modified pre-restart writer pointer 1 serves as index to pre-restart translation base pointer 1; modified pre-restart writer pointer 2 serves as index to pre-restart translation base pointer 2, and so on. In some embodiments, each of the rows of table 124, i.e., pre-restart translation base pointers, identifies a base pointer of a corresponding addressed page in shared memory 104. For example, pre-restart translation base pointer 0, in table 124, may be the first pointer of a corresponding page with the next pointer calculated by incrementing the base pointer by one and the following pointer similarly calculated by incrementing the previous pointer by one and so on. In some embodiments, each of the pre-restart translation base pointers of table 124 identifies a region and offset pair location of a corresponding object in the first portion 104a of shared memory 104. For example, pre-restart translation base pointer 0 of table 124 may be a pointer to the first location (offset '0' or offset '1') in region 25 of hierarchical state data structure 136. In this respect, the pre-restart translation base pointers of table 124 are shared memory location-dependent pointers and correspond to the pre-restart writer addressable space (e.g., 0x1000). Accordingly, reader agent 106 translates each writer pointer to a local reader addressable space. For example, each of the pre-restart translation base pointers of table 124 may be translated to the pre-restart reader addressable space 0x10000. Each row of table 124 includes a distinct pre-restart translation base pointer for each page.

In an example operation, writer agent 102 maintains an association of modified pre-restart writer pointers and pre-restart translation base pointers at table 124. Writer agent 102 may write a pre-restart writer pointer, for example, pre-restart writer pointer 0, of a corresponding object, for example, root object 110, with the pre-restart writer pointer pointing to a location in shared memory 104 for identifying an object linked to root object 110, for example, object A 112. Writer agent 102 may record the new home of the pre-restart writer pointer or a modified version in table 124. For example, writer agent 102 may modify the pre-restart writer pointer by shifting the pre-restart writer pointer 0 by 12 bits to the right, and using the modified pre-restart writer pointer, for example, modified pre-restart writer pointer 0, write a corresponding pre-restart translation base pointer, for example, pre-restart translation base pointer 0, to table 124. In some embodiments, a pre-restart translation base pointer is a two-field value, one field is the writer's base address of the region and the other field is a region identification that indicates a location within the region. From this two-field information, the reader agent may perform a local lookup of region 25 and calculate the local reader address pointer. In some embodiments, the location of objects in shared memory 104 may be identified by other mechanisms instead of with the writer base address of the region and the region identification. In some embodiments, the writer base address of the region may be offset 0. Alternative ways of identifications of object locations in table 124 and further details of the region, offset pair identification can be found in U.S. Patent Publication No. 2020/0104196, published on Apr. 2, 2020, filed on Jul. 19, 2019, by Ritchie et al., and titled "System and Method of a Shared Memory Allocator", the disclosure of which is incorporated by reference as though set forth in full.

To access the writer-published data, reader agent 106 accesses root object 110 and reads a corresponding pre-restart writer pointer, for example, pre-restart writer pointer 0 pointing to object A 112. Reader agent 106 is aware of the pre-restart writer pointer's correspondence with a restart writer addressable space although the reader agent does not necessarily know or need to know exactly the specific restart writer addressable space. Stated differently, reader agent 106 knows to translate the pre-restart writer pointer to a reader pointer based on the pre-restart reader addressable space. Reader agent 106 first modifies the pre-restart writer pointer (e.g., pre-restart writer pointer 0) by shifting the pre-restart writer pointer to the right by 12 bits to determine the corresponding modified pre-restart writer pointer (e.g., pre-restart writer pointer 0). Reader agent 106 looks up the corresponding pre-restart translation base pointer (e.g., pre-restart translation base pointer 0) in table 124, which in some embodiments, may be region-based, and now knows the region identification of the pre-restart writer pointer (e.g., 25). Reader agent 106 performs a local translation of the pre-restart translation base writer pointer (e.g., pre-restart translation base writer pointer 0) to reader pointer based on the restart reader addressable space (0x10000), for example, in accordance with a method (huge-map, page-map, . . . ) disclosed in the patent document referenced above. Reader agent 106 may perform the local translation using a different method, one that is not disclosed in the above-referenced patent document, nevertheless suitable for translating the reader pointer from table 124 to a pointer based on the reader addressable space.

In some embodiments, writer agent 102 writes an address pointer type indicator when writing the pre-reset writer pointer in root object 110 or thereafter. The address pointer type indicator represents the type of pointer the writer agent is writing. For example, the address pointer type indicator may represent two distinct types of pointers, one that is a raw writer pointer (e.g., pre-restart writer pointer) and another that is a location independent pointer. The location independent pointer (LIP) is not necessarily region or location dependent. In some embodiments, a LIP is a hash value maintained in a hash table, such as table 132 in reader agent 106. Further details of LIPs, the conversion of pre-restart writer pointers to LIPs, and the conversion of LIPs to post-restart writer pointers are provided in the patent document referenced above. Table 132 may be maintained externally to reader agent 106. In comparison to raw pointers, LIPs pose a slower lookup process and are therefore employed on a temporary basis as an intermediate process for allowing the readers of shared memory 104, such as reader 106, to proceed with working on shared memory data without interruption in response to a writer restart operation, as previously discussed.

FIGS. 2-3 each shows an illustrative diagram of a memory management system. In FIG. 2, a memory management system 200 is shown to include a writer agent 202, shared memory 204, and a reader agent 206, in accordance with an embodiment of the disclosure. In FIG. 3, a memory management system 300 is shown to include a writer agent 302, shared memory 304, and a reader agent 306, in accordance with an embodiment of the disclosure. The embodiments of FIGS. 1-3 collectively show the first, second, and third steps (or stages), of a writer restart operation, in accordance with various embodiments and methods of the disclosure. As such, reference is made to these figures in the following description.

As previously stated, the state of the shared memory prior to a writer restart operation is shown in FIG. 1. During or immediately after a writer restart operation, an example of an interim writer restart memory state is shown in FIG. 2. After a writer restart operation, the writer agent, shown in system 200 as a writer agent 202, rebuilds the writer pointer translation table in the shared memory to replace the association of modified pre-restart writer pointers and pre-restart translation base pointers based on the pre-restart writer pointers, respectively, with an association of the modified post-restart writer pointers and post-restart translation pointers based on the post-restart writer pointers, respectively. The post-restart writer pointers uniquely identify the locations of entries in the shared memory at a post-restart writer addressable space (e.g., 0x2000 in FIGS. 2, 3) that is employed by the writer agent to access the entries in the shared memory after the writer restart operation. Analogously, the pre-restart writer pointers uniquely identify the locations of entries in the shared memory at a pre-restart writer addressable space (e.g., 0x1000 in FIG. 1) that is employed by the writer to access the entries in the shared memory prior to the writer restart operation (shown in FIG. 1). For example, and with reference to FIGS. 2-3, the post-restart writer addressable space is 0x2000 whereas the pre-restart writer addressable space was 0x1000 (FIG. 1). The writer agent (writer agent 202 and writer agent 302) replaces each of the pre-restart writer pointers in the hierarchical state data structure 136 with a corresponding LIP to guard against the readers of shared memory 204 (or shared memory 304 of FIG. 3) accessing the entry data written by the writer to shared memory to prevent adverse repercussions. With particular reference to FIG. 2, showing step 2 of the restart process, writer agent 202 has replaced pre-restart writer pointer 0, pre-restart writer pointer 1, pre-restart writer pointer 2, and pre-restart writer pointer 3 of the embodiment of FIG. 1 with LIP 0, LIP 1, LIP 2, and LIP 3, respectively, while writer agent 202 has yet to replace pre-restart writer pointer 4, pre-restart writer pointer 5, pre-restart of writer pointer 6, and pre-restart writer pointer 7 with corresponding LIPs. Reader agent 206 has the requisite knowledge to access the entry data despite the pointer difference, as further discussed below.

Replacing the pre-restart writer pointers with interim LIPs allows the writer agent to work at a convenient pace in rebuilding the writer pointer translation table (e.g., table 224) in shared memory 204 (or 304 in FIG. 3) with post-restart writer pointers. In the meanwhile, the contents of writer pointer translation table 224 of FIG. 2 remain the same as the contents of table 124 of FIG. 1. Accordingly, readers of the shared memory (e.g., reader agent 206 of FIG. 2 and reader agent 306 of FIG. 3) have free and unlimited access to and can consume data from shared memory 204 in a lock-free, concurrent, and wait-less manner, regardless of the number of readers and regardless of the activity in which the writer (writer agent 202 of FIG. 2 and writer agent 302 of FIG. 3) may be engaged.

In some embodiments, at step 3 in the restart process, the writer agent replaces the temporary LIPs with post-restart writer pointers in the shared memory, respectively. In some embodiments of the disclosure, upon completion of replacing the pre-restart writer pointers of FIG. 1 with LIPs, as discussed above, writer agent 302 of FIG. 3 replaces the LIPs with the post-restart writer pointers and the post-restart writer pointers are based on the newly assigned restart writer addressable space, a space reassigned to writer agent 302 after the restart operation. For example, LIP 0 of FIG. 2 is replaced with post-restart writer pointer 0, LIP 1 of FIG. 2 is replaced with post-restart writer pointer 1, and so on.

Notably, the contents of writer pointer translation table 224 are affected after the writer restart operation and particularly after all pre-restart writer pointer-to-LIP conversion for all objects of shared memory 204 has been performed. After the restart process, the writer agent may generate a new set of modified writer pointers based on the newly assigned (post-) restart writer addressable space (e.g., 0x2000). For example, writer agent 302 (FIG. 3) may modify the post-restart writer pointer 0 of the second portion 104b of shared memory 104 by truncating the 12 LSBs of the post-restart writer pointer 0 and use the remaining MSBs of the post-restart writer pointer 0 to index table 324. Writer agent 302 populates writer pointer translation table 324 of FIG. 3 with corresponding post-restart translation base pointers, indexed by respective modified post-restart writer pointers, accordingly. In some embodiments, each post-restart translation base pointer uniquely identifies a post-restart writer base address and a corresponding region identification, as described above relative to FIG. 1. In some embodiments, writer agent 302 may index table 324 with non-modified post-restart writer pointers. Accordingly, in some embodiments, writer agent 302 stores the post-restart writer pointers in the second portion 104b of the shared memory for access by one or more readers of the shared memory (e.g., shared memory 304). The pre-restart reader addressable space (e.g., 0x10000) remains unchanged after the writer restart process.

Figure 4:
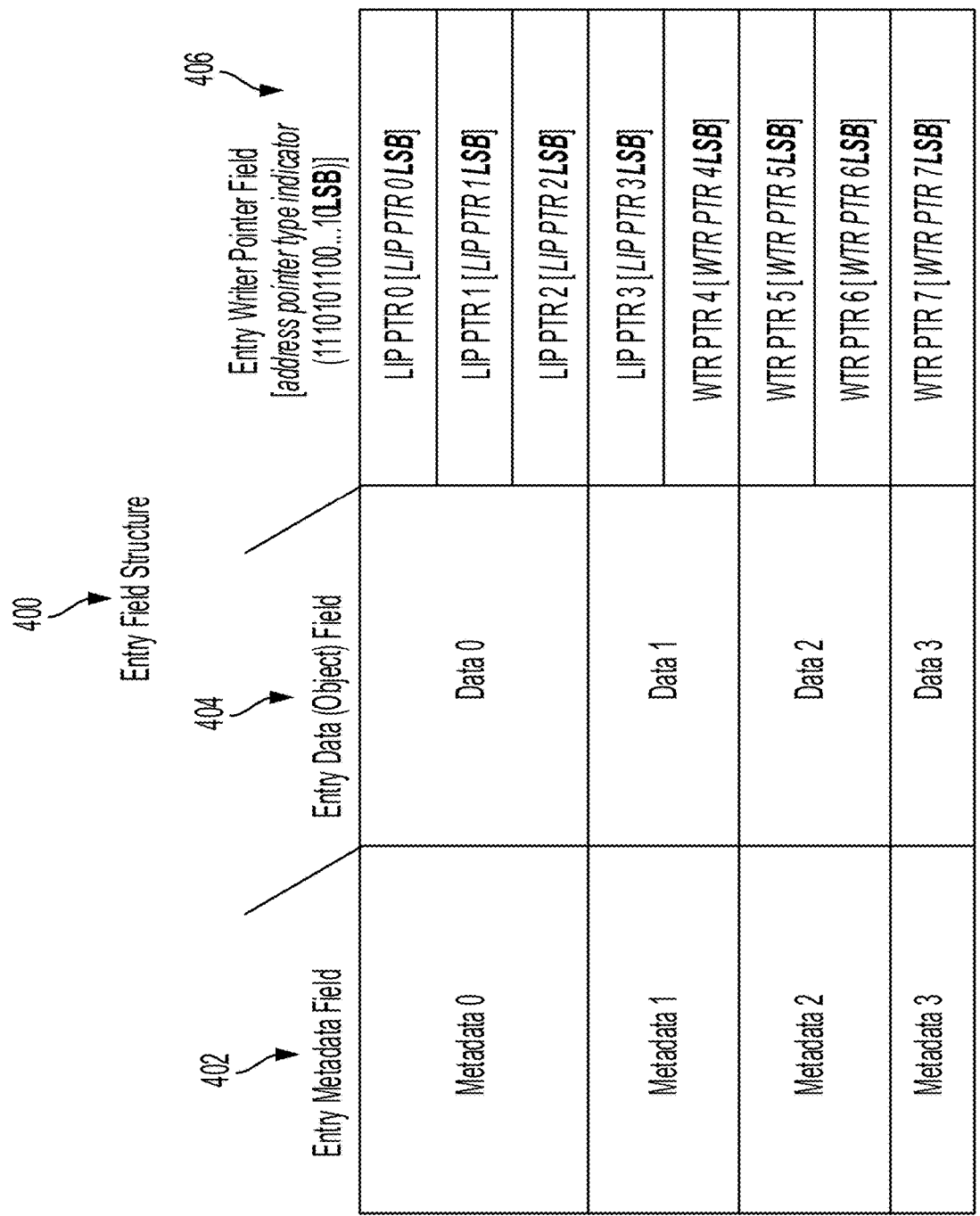
FIG. 4 shows an illustrative diagram of an example entry field structure 400, in accordance with some embodiments of the disclosure.

FIG. 4 shows an illustrative diagram of an example entry field structure 400 of some embodiments of the disclosure. An entry may include an object (or data or object data) in addition to other information, such as metadata and address pointers. In FIG. 4, an entry is shown to include an entry metadata field 402, an entry data field 404, and an entry writer pointer field 406. Each entry may belong to a hierarchical state data structure. For example, the entry of FIG. 4 belongs to hierarchical state data structure 136 of FIGS. 1, 2, and 3.

The pointers of FIG. 4 follow the example of FIG. 2 in that objects with one or more pointers (raw or LIP), in FIG. 4, correspond to objects with pointers in FIG. 2. For example, in accordance with the memory state of FIG. 2, some of the pre-restart writer pointers of various objects of hierarchical state data structure 136 are converted to LIPs and some of the pre-restart writer pointers remain the same. Specifically, the pre-restart writer pointers (pre-restart writer pointers 0-2, shown with corresponding metadata 0 and data 0 in FIG. 4) are converted to LIPs (LIPs 0-2), respectively, while the pre-restart writer pointers (pre-restart writer pointer 5 and pre-restart writer pointers 6, shown with corresponding metadata 2 and data 2 in FIG. 4) remain as pre-restart writer pointers.

In some embodiments, the LSB of the LIP or raw writer pointer is used to indicate the pointer type. That is, the entry writer pointer field 406 of FIG. 4 includes either a writer pointer or a LIP with an LSB representing the address pointer type indicator discussed above. As previously noted, the address pointer type indicator need not be represented by the LSB of the writer pointer or LIP and can be at a different bit location of the writer pointer or LIP. In some embodiments, the address pointer type indicator is written simultaneously with the writer pointer or LIP, as the case may be, by the writer agent. Specifically, in embodiments where the address pointer type indicator is a part of the writer pointer and the LIP, such as the embodiment of FIG. 4, the address pointer type indicator is written simultaneously with the writer pointer and the LIP. In embodiments with simultaneous writing of the writer pointer and the address pointer type indicator, readers enjoy a lock-free and wait-less consumption experience. In some embodiments, the address pointer type indicator need not be written simultaneously with the writer pointer or the LIP and can be written after the writer pointer or the LIP are written. For example, writer agent 302 (in FIG. 3) may write the writer pointer or LIP and thereafter write the address pointer type indicator. In some cases, an indicator, such as a bit or a flag, may be set to indicate whether the address pointer type indicator has been written by the writer agent, for example.

Figure 5:
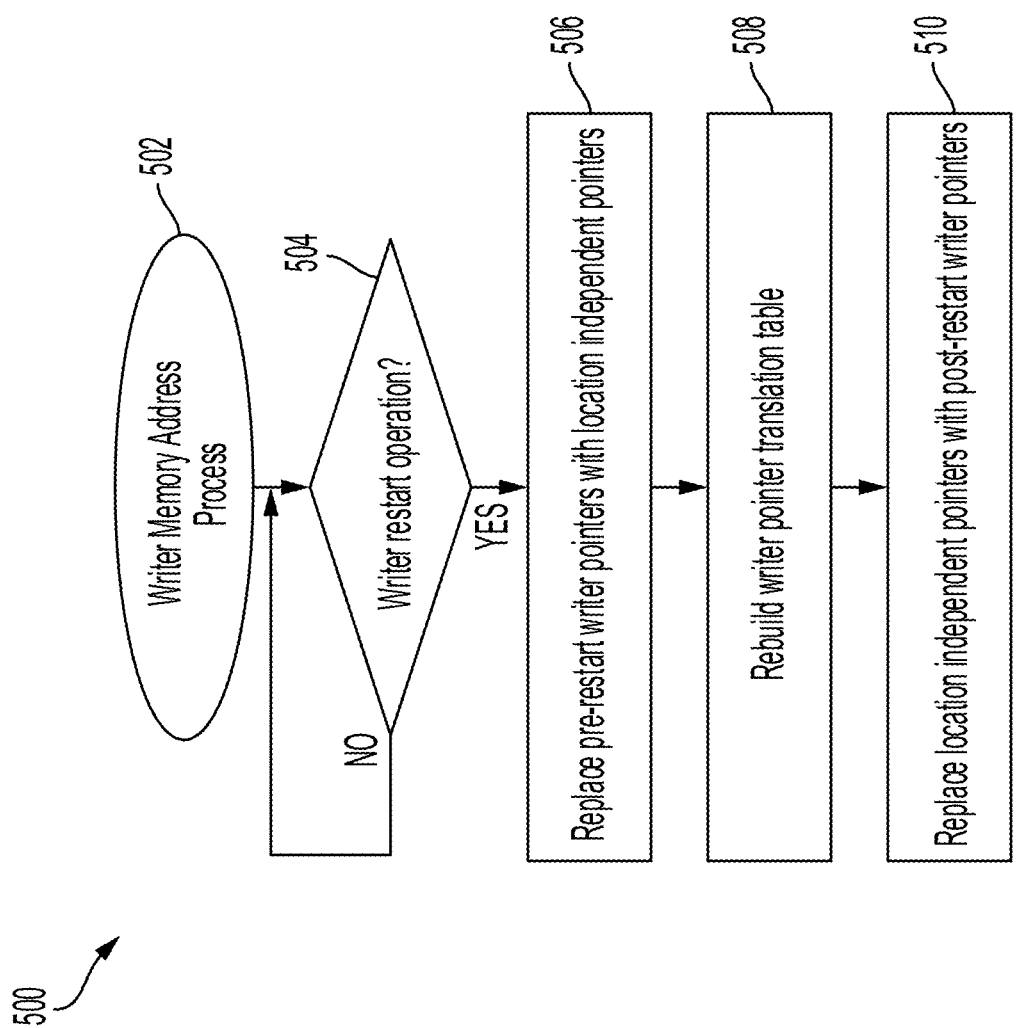
FIG. 5 shows a flowchart of an illustrative process for performing a writer memory address process, in accordance with some embodiments of the disclosure.

FIG. 5 shows a flowchart of an illustrative process 500 for performing a writer memory address process, in accordance with some embodiments of the disclosure. In some embodiments, process 500 may be implemented by systems 100, 200, and 300 of FIGS. 1, 2, and 3. In some embodiments, process 500 may be implemented by writer memory address processing systems other than those shown and described herein. In an example embodiment, a writer, such as writer agent 102, 202, or 302 of FIG. 1, 2, or 3, respectively, may carry out the steps of process 500.

In the interest of simplicity of illustration, the writer agent of FIG. 3 is referenced below in reference to a discussion of process 500. At step 502, writer agent 302 begins a writer memory address process. At step 504, writer agent 302 is at a pre-restart operation state resembling the state of FIG. 1 with pre-restart writer pointers 0-7 based on pre-restart write addressable space (e.g., 0x1000). In response to a writer restart operation, process 500 proceeds to step 506. At step 506, writer agent 302 (FIG. 3) replaces the pre-restart writer pointers of step 506 with LIPs, as shown in FIG. 2. Upon completion of the pre-restart writer pointers conversion to LIPs at step 506, process 500 performs step 508. At step 508, writer agent 302 rebuilds the writer pointer translation table (e.g., table 324) and at step 510, after the completion of rebuilding the writer pointer translation table at step 508, writer agent 302 replaces the LIPs of the shared memory with post-restart writer pointers based on the newly assigned (post-restart) writer addressable space (e.g., at 0x2000). Accordingly, the post-restart writer pointers of step 510 of the objects of hierarchical state data structure 136, for example, of system 300 replace corresponding pre-restart writer pointers of system 100. In some embodiments, the post-restart writer pointers are stored in the shared memory for access by one or more readers of the shared memory.

Figure 6:
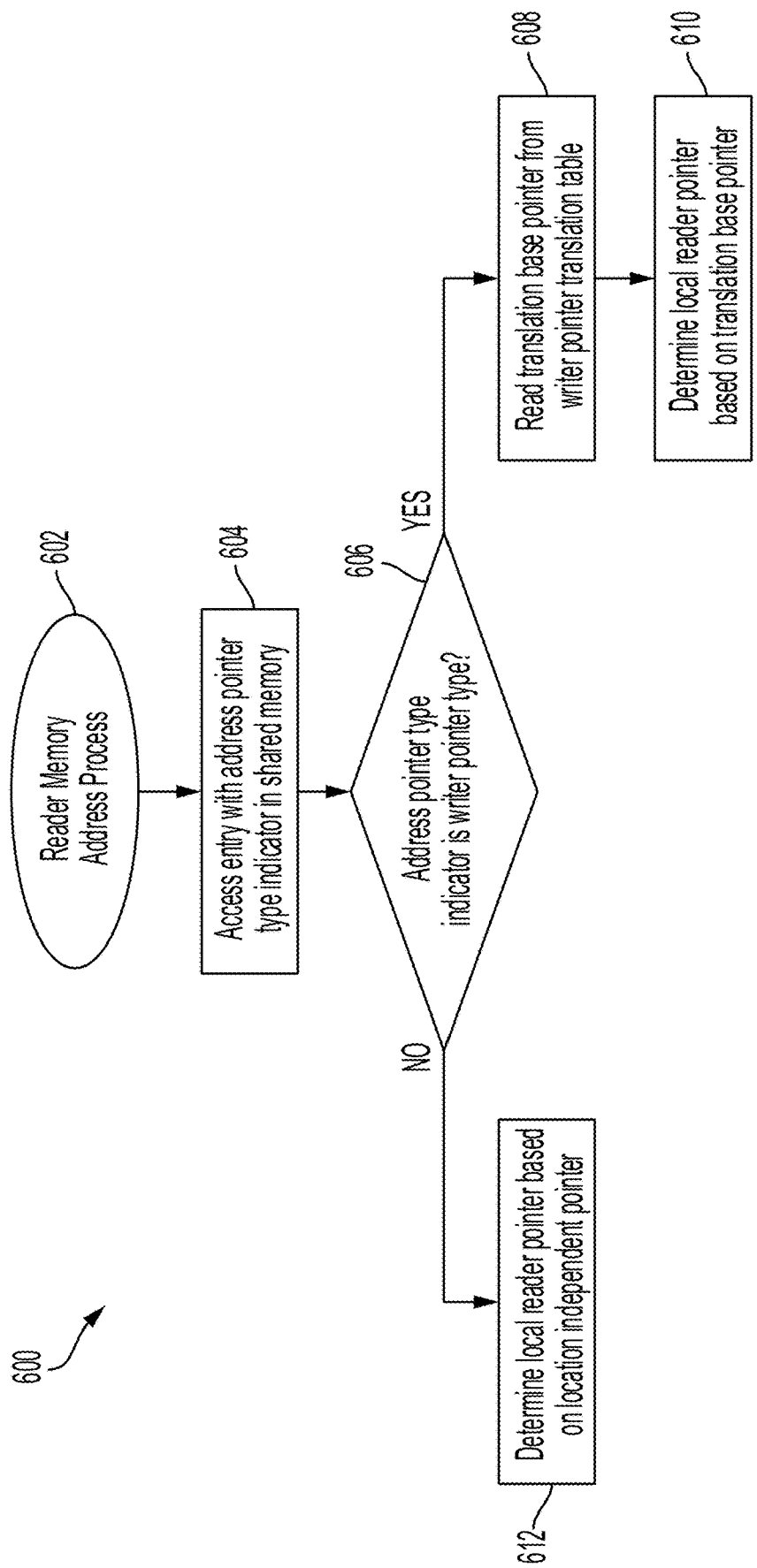
FIG. 6 shows a flowchart of an illustrative process for performing a reader memory address process, in accordance with some embodiments of the disclosure.

FIG. 6 shows a flowchart of an illustrative process 600 for performing a reader memory address process, in accordance with some embodiments of the disclosure. At step 602 of process 600, the reader agent begins a memory address process. At step 604, the reader agent accesses an entry with an address pointer type indicator in shared memory. For example, with reference to FIG. 3, reader agent 306 may address an entry of hierarchical state data structure 326, at step 604 (e.g., the entry of root object 110). At step 606, reader agent 306, having read a pointer (whether a pre-restart writer pointer or a LIP), determines whether the address pointer type indicator simultaneously read with the pointer represents a raw writer pointer or a LIP and in response to the reader agent determining that the address pointer type indicator represents a writer pointer type, process proceeds to step 608, otherwise, process 600 proceeds to step 612. At step 608, the reader agent reads the translation base pointer from the shared memory writer pointer translation table (e.g., table 324) and at step 610, the reader agent determines the local reader pointer to translate the read translation base pointer to a local reader pointer based on the post-restart (or pre-restart since the reader addressable space remains unchanged before, during and after the writer restart operation) reader addressable space (e.g., 0x10000). In determining, at step 606, that the address pointer type indicator does not represent a writer pointer type, or in determining at step 606, that the address pointer type indicator is a LIP type, process 600 proceeds to step 612. At step 612, the reader agent determines the local reader pointer based on the LIP and may forgo resorting to the writer pointer translation table (e.g., table 324).

Although a particular order and flow of steps is depicted in each of FIGS. 5-6, it will be understood that in some embodiments one or more of the steps in each figure may be suitably modified, moved, removed, or added, and that the flow depicted in these figures may be modified.

Figure 7:
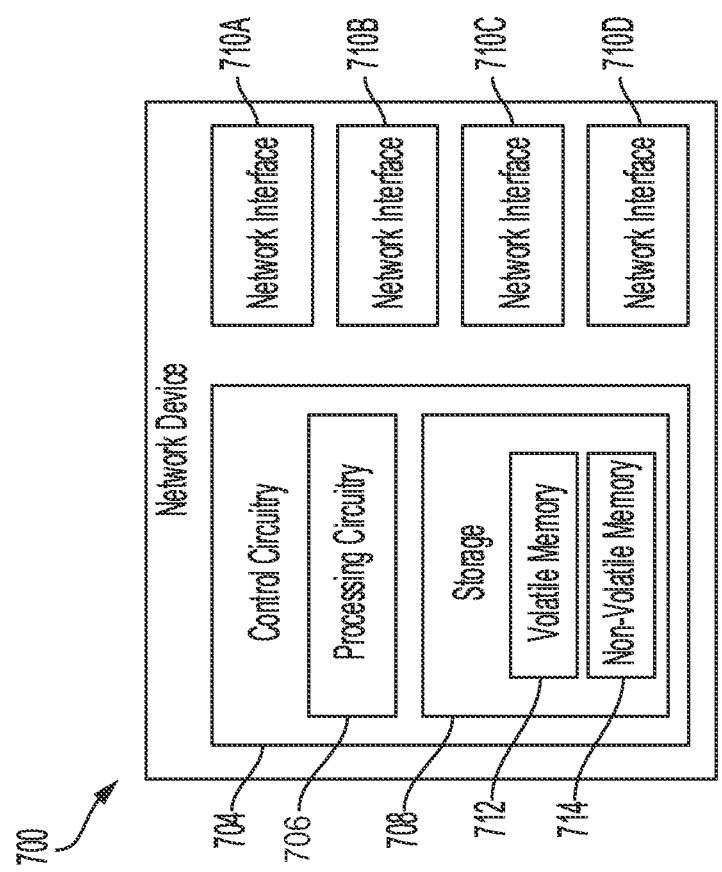
FIG. 7 shows a diagram of an illustrative network device of each of the systems of FIGS. 1, 2, and 3, in accordance with some embodiments of the disclosure.

FIG. 7 shows a generalized embodiment of a network device 700. Network device 700 may be a router, a switch, and/or any other network device configured as systems 100, 200, and 300 of FIGS. 1, 2, and 3, respectively, with a shared memory with data produced by writer agents (e.g., writer agents 102, 202, and 302 of FIGS. 1, 2, and 3, respectively) addressing entries of objects hierarchically organized in the shared memory, the objects logically representing respective system states. Network device 700 may receive via a network interface (e.g., network interface 710A), network traffic route configuration data, dynamically changing to reflect the dynamic route configuration of a corresponding network traffic, store the configuration data as system states in the form of hierarchical state data structures of objects of logical representation of the changing system states (e.g., hierarchical state data structure 136, 236, and 336 of FIGS. 1, 2, 3, respectively) in storage 708 for readers of storage 708. In some embodiments, network device 700 performs storage of the hierarchical data structures with control circuitry 704, which includes processing circuitry 706 and storage 708. In some embodiments, storage 708 may be configured as a shared memory, for example, shared memory 104, 204, or 304 of FIG. 1, 2, or 3, respectively. In some embodiments, execution of a writer program code, stored in storage 708, by processing circuitry 706, implements a writer agent (e.g., writer agent 102, 202, 302 of FIGS. 1, 2, 3, respectively) of the shared memory. In some embodiments, execution of a reader program code, stored in storage 708, by processing circuitry 706, implements a reader agent (e.g., reader agent 106, 206, 306 of FIGS. 1, 2, 3, respectively) of the shared memory.

While network device 700 is shown as including four network interfaces (e.g., network interfaces 710A, 710B, 710C, and 710D), this is merely illustrative, and those skilled in the art will appreciate that network device 700 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.)

Control circuitry 704 may be based on any suitable processing circuitry, such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 704 executes instructions for performing various operations as a producer would perform on a shared memory, as described above with reference to FIGS. 1-3. For example, control circuitry 704 may perform the writer processes or certain writer steps of the processes of FIG. 5. In some embodiments, control circuitry 704 executes instructions for performing various operations as a consumer would perform on a shared memory, as described above with reference to FIGS. 1-3. For example, control circuitry 704 may perform the reader processes or certain reader steps of the process of FIG. 6.

Storage 708 may include volatile random-access memory (RAM) 712, which does not retain its contents when power is turned off, and non-volatile RAM 714, which does retain its contents when power is turned off. In some embodiments, storage 708 may be an electronic storage device that is part of control circuitry 704. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, one or more writer pointer translation tables 124, 224, 324 of FIGS. 1, 2, 3, respectively are stored in storage 708. In other embodiments, one or more of the writer pointer translation tables 124, 224, 324 may be stored on a separate device and a link to a corresponding may be stored in storage 708. In some embodiments, a root object, such as root object 110, root object 210, or root object 310, may be stored in storage 708. In some embodiments, a root object, such as root objects 110, 210, or 310, may be stored on a separate device and a link to the root object may be stored in storage 708. In some embodiments, one or more hierarchical state data structures, such as hierarchical state data structures 136, 236, 336 or FIGS. 1, 2, and 3, may be stored in storage 708. In some embodiments, one or more reader hierarchical state data structures, such as hierarchical state data structures 136, 236, 336, may be stored on a separate device and a link to the root object may be stored in storage 708. The circuitry described herein may execute instructions included in software running on one or more general purpose or specialized processors. Multiple circuits may be provided to handle simultaneous processing functions.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of processing memory address spaces corresponding to a shared memory comprising:
   in response to a writer restart operation:
      replacing a plurality of pre-restart writer pointers of a pre-restart writer addressable space in the shared memory with a corresponding plurality of location independent pointers, wherein:
         the plurality of pre-restart writer pointers uniquely identifies locations of entries in the shared memory at the pre-restart writer addressable space employed by a writer to access the entries in the shared memory prior to the writer restart operation;
      rebuilding a writer pointer translation table in the shared memory to replace an association of modified pre-restart writer pointers and pre-restart translation base pointers based on the plurality of pre-restart writer pointers, respectively, with an association of modified post-restart writer pointers and post-restart translation base pointers based on a plurality of post-restart writer pointers, respectively, wherein:
         the plurality of post-restart writer pointers uniquely identifies the locations of the entries in the shared memory at a post-restart writer addressable space employed by the writer to access the entries in the shared memory after the writer restart operation;
      replacing the plurality of location independent pointers with the plurality of post-restart writer pointers in the shared memory, respectively; and
      storing the plurality of post-restart writer pointers in the shared memory for access by one or more readers of the shared memory.

2. The method of claim 1, wherein the plurality of pre-restart writer pointers in the shared memory are replaced with the plurality of post-restart writer pointers using the plurality of location independent pointers, respectively, such that the one or more readers of the shared memory can access the entries while the plurality of pre-restart writer pointers are replaced with the plurality of post-restart writer pointers in the shared memory.

3. The method of claim 1, wherein the locations of the entries in the shared memory are identifiable to the one or more readers of the shared memory based on the pre-restart translation base pointers prior to the writer restart operation and the locations of the entries in the shared memory are identifiable to the one or more readers of the shared memory based on the post-restart translation base pointers after the writer restart operation.

4. The method of claim 1, wherein at least a portion of the shared memory is organized into one or more regions including the entries and the method further comprises determining the plurality of location independent pointers based on, at least in part, region identifications uniquely identifying corresponding regions of the shared memory.

5. The method of claim 4, wherein determining the plurality of location independent pointers is further based on offsets to the regions, wherein an offset of a corresponding region distinctly identifies a corresponding entry in the corresponding region.

6. The method of claim 1, wherein prior to the writer restart operation, the entries are accessible to the one or more readers of the shared memory based on a translation of the pre-restart writer pointers to corresponding reader pointers.

7. The method of claim 1, wherein after the writer restart operation, the entries are accessible to the one or more readers of the shared memory based on a translation of the post restart writer pointers to corresponding reader pointers.

8. The method of claim 1, further comprising setting an address pointer type indicator of a corresponding writer pointer of a corresponding entry to indicate an entry address of the corresponding entry is of a writer pointer type or a location independent pointer type.

9. The method of claim 8, wherein the address pointer type indicator of the corresponding entry is set to the writer pointer type causing the one or more readers of the shared memory to locally translate corresponding reader pointers from the writer pointer translation table of the shared memory to a reader pointer uniquely identifying the location of a corresponding entry in the shared memory to the reader at a reader address space.

10. The method of claim 8, wherein the address pointer type indicator of the corresponding entry is set to the location independent pointer type causing a reader of the one or more readers of the shared memory to locally translate a location independent pointer of the corresponding entry, maintained by the reader, to a corresponding reader pointer uniquely identifying the location of the corresponding entry in the shared memory to the reader of the one or more readers of the shared memory at a reader address space.

11. The method of claim 8, wherein setting the address pointer type indicator is performed simultaneously with or after replacing the plurality of pre-restart writer pointers at the pre-restart writer addressable space with the corresponding plurality of location independent pointers.

12. The method of claim 8, wherein the address pointer type indicator is maintained as a part of a writer pointer field of the corresponding entry in the shared memory.

13. The method of claim 1, wherein the modified pre-restart writer pointers are a truncated version of the plurality of pre-restart writer pointers, respectively, and the modified post-restart writer pointers are a truncated version of the plurality of post-restart writer pointers, respectively.

14. A method of processing memory address spaces corresponding to a shared memory comprising:
    accessing an entry in the shared memory, the entry including a corresponding writer pointer with a corresponding address pointer type indicator indicative of a writer pointer type or a location independent pointer type, wherein the entry further includes entry data written by a writer of the shared memory;
    in response to the address pointer type indicator indicative of the writer pointer being a writer pointer type, a reader:
    reading a translation base pointer from a writer pointer translation table of the shared memory, the translation base pointer based on the writer pointer,
    determining a local reader pointer based on the translation base pointer, the local reader pointer uniquely identifying the location of the entry in the shared memory at a reader addressable space employed by the reader to access the entry in the shared memory; and
    in response to the address pointer type indicator indicative of the writer pointer being a location independent pointer, the reader:
        determining the local reader pointer based on the location independent pointer, the location independent pointer uniquely identifying the location of the entry in the shared memory at the reader addressable space employed by the reader to access the entry in the shared memory.

15. The method of claim 14, wherein the entry is accessed with the location independent pointer after a writer restart operation and the entry is accessed with the writer pointer after the location independent pointer is replaced with the writer pointer.

16. The method of claim 15, wherein at least a portion of the shared memory is organized into one or more regions and the location independent pointer is based on, at least in part, a region identification uniquely identifying a corresponding region of the entry in the shared memory.

17. The method of claim 16, wherein an offset of the corresponding region distinctly identifies the location of the entry within the corresponding region.

18. The method of claim 14, wherein at least a portion of the shared memory is organized into one or more regions and the writer pointer is based on, at least in part, a region identification uniquely identifying a corresponding region of the entry in the shared memory.

19. The method of claim 18, wherein an offset of the corresponding region distinctly identifies the location of the entry within the corresponding region.

20. A method of processing memory address spaces corresponding to a shared memory to which a writer agent produces data and a reader agent consumes the data, the method comprising:
    the writer agent replacing a plurality of pre-restart writer pointers of a pre-restart writer addressable space in the shared memory with a corresponding plurality of location independent pointers, wherein:
        the plurality of pre-restart writer pointers uniquely identifies locations of entries in the shared memory at the pre-restart writer addressable space employed by the writer agent to access the entries in the shared memory prior to the writer restart operation,
        the plurality of pre-restart writer pointers and the plurality of location independent pointers including respective address pointer indicator types indicative of corresponding writer pointers being a pre-restart writer pointer or a location independent pointer, and
        the address pointer indicator types are written to shared memory at the same time as the writer pointers;
    replacing the plurality of location independent pointers with a plurality of post-restart writer pointers in the shared memory, respectively, after the writer restart operation, wherein:
        the plurality of post-restart writer pointers uniquely identify the locations of the entries in the shared memory at a post-restart writer addressable space employed by the writer agent to access the entries in the shared memory after the writer restart operation, and each of the plurality of pre-restart writer pointers includes a corresponding address pointer indicator type;
    in response to determining an address pointer type indicator is indicative of the writer pointer being a location independent pointer, the reader agent:
        determining a local reader pointer based on the location independent pointer;
    in response to determining an address pointer type indicator is not indicative of the writer pointer being a location independent pointer, the reader agent:
        reading a translation base pointer from a writer pointer translation table of the shared memory, the translation base pointer based on the writer pointer, and
        determining a local reader pointer based on the translation base pointer, the local reader pointer uniquely identifying the location of the entry in the shared memory at a reader addressable space employed by the reader agent to access the entry in the shared memory before and after the writer restart operation.

* * * * *